United States Patent [19]
Karras

[11] Patent Number: 5,840,108
[45] Date of Patent: Nov. 24, 1998

[54] METHOD AND APPARATUS FOR CONTINUOUS PREPARATION OF CORRUGATING ADHESIVE

[76] Inventor: George C. Karras, 35 W. 65th St., New York, N.Y. 10023

[21] Appl. No.: 869,689

[22] Filed: Jun. 5, 1997

Related U.S. Application Data

[63] Continuation-in-part of Ser. No. 687,648, Jul. 26, 1996, abandoned.

[51] Int. Cl.⁶ .................................................. C09J 103/02
[52] U.S. Cl. ........................................................ 106/211.1
[58] Field of Search ............................... 106/211.1, 217.2

[56] References Cited

U.S. PATENT DOCUMENTS

| | | | |
|---|---|---|---|
| 2,051,025 | 8/1936 | Bauer | 156/208 |
| 2,102,937 | 12/1937 | Bauer | 106/206.1 |
| 2,212,557 | 8/1940 | Bauer | 106/217.01 |
| 3,228,781 | 1/1966 | Halpert . | |
| 3,355,307 | 11/1967 | Schoenberger et al. | 106/206.1 |
| 3,622,388 | 11/1971 | Larsen | 422/108 |
| 3,830,473 | 8/1974 | Lieferman et al. . | |
| 4,329,181 | 5/1982 | Chiu et al. | 106/206.1 |
| 4,366,275 | 12/1982 | Silano et al. | 524/47 |
| 4,400,219 | 8/1983 | Vanderputten et al. | 127/23 |
| 4,826,719 | 5/1989 | Murdock et al. | 428/182 |
| 5,000,788 | 3/1991 | Stotler | 106/211.1 |
| 5,075,360 | 12/1991 | Fitt et al. | 524/48 |
| 5,135,310 | 8/1992 | Nodus et al. | 366/297 |
| 5,187,210 | 2/1993 | Fitt et al. | 524/48 |
| 5,236,977 | 8/1993 | Eden et al. | 524/49 |
| 5,247,066 | 9/1993 | Schoenberg et al. | 528/491 |
| 5,286,769 | 2/1994 | Eden et al. | 524/49 |

FOREIGN PATENT DOCUMENTS

| | | |
|---|---|---|
| 2 184 455 | 12/1973 | France . |
| 2 449 717 | 9/1980 | France . |

OTHER PUBLICATIONS

Derwent Database Abstract XP 002046584 (Dec. 1973).

*Primary Examiner*—David Brunsman
*Attorney, Agent, or Firm*—McAulay Fisher Nissen Goldberg & Kiel, LLP

[57] ABSTRACT

A corrugating adhesive is produced on an as needed continuous basis using a mixing chamber containing an agitator and a testing chamber including a viscosity sensor. Each adhesive ingredient is proportionally added to the mixing chamber in a total volumetric rate corresponding substantially to the rate of use in a corrugating machine. A portion of a raw starch slurry is adjustably diverted to mix with a basic agent to control adhesive viscosity, with the amount not admixed added to the mixing chamber. Thus, the amount of adhesive made is in balance with the amount used, allowing fresh adhesive to be provided throughout a corrugating run, without a large hold up of adhesive, thus reducing capital costs and adhesive waste.

8 Claims, 4 Drawing Sheets

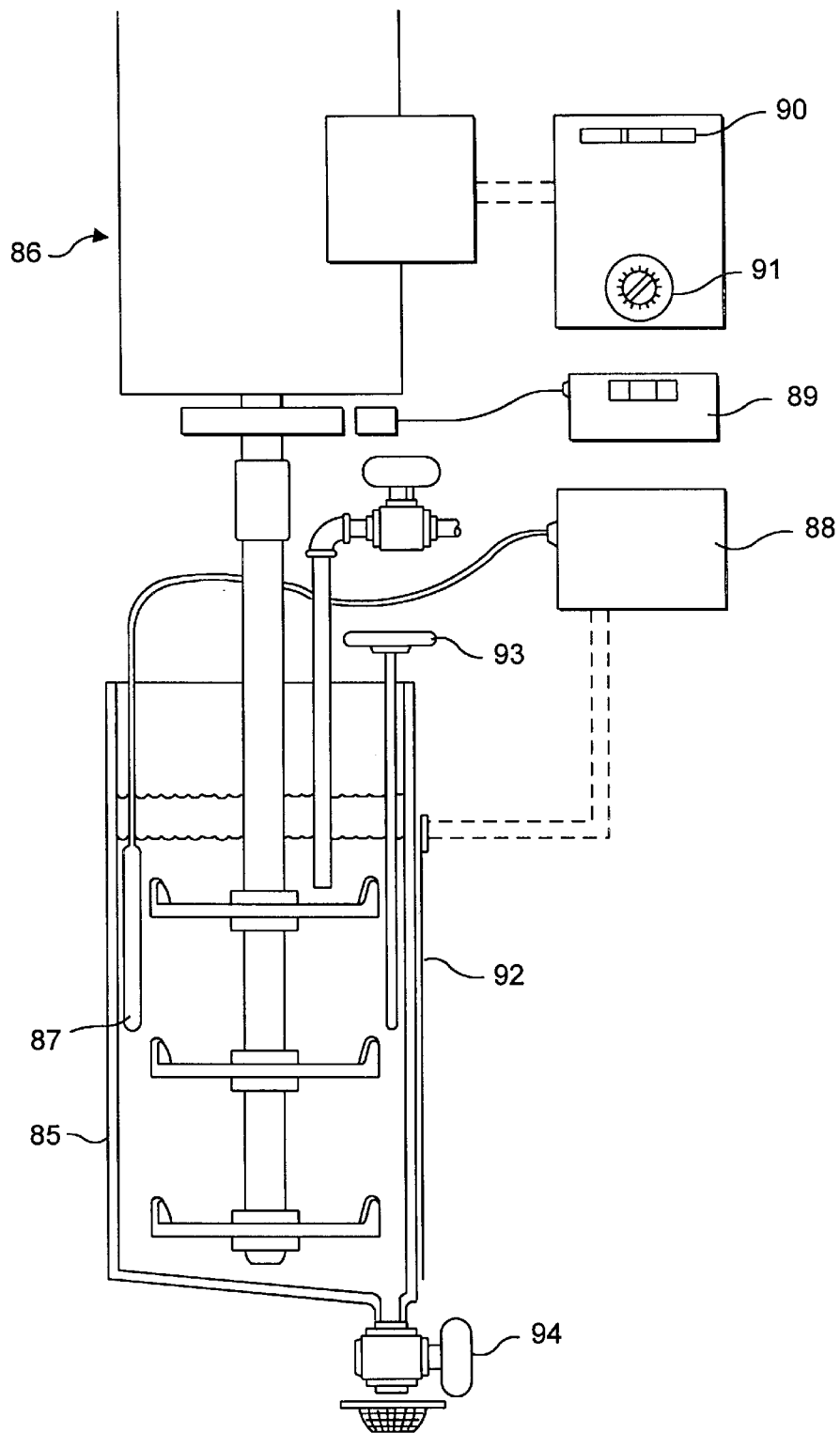
F I G. 5

METHOD AND APPARATUS FOR CONTINUOUS PREPARATION OF CORRUGATING ADHESIVE

CROSS-REFERENCE TO RELATED APPLICATION

This application is a continuation-in-part of application Ser. No. 08/687,648 filed Jul. 26, 1996, now abandoned.

TECHNICAL FIELD

This invention relates to corrugating adhesives and more particularly to a method and apparatus for the continuous preparation of corrugating adhesive to minimize waste, improve properties and to reduce costs.

BACKGROUND OF THE INVENTION

Adhesives used in manufacturing corrugated board are usually comprised of starch, a boron containing compound, caustic or another basic agent, and optionally a water resistance additive, where water resistance is needed, all provided in a water base. The major component of the adhesive is the starch which is gelatinized in the corrugating process after it penetrates the paper fiber. The other components are agents which modify the basic properties of the starch. For example, caustic usually in the form of sodium hydroxide, modifies the gelation temperature of the starch. Boron containing compounds are used to adjust or modify the adhesive tackiness, while also acting as buffering agents and to maintain the viscosity. Water resistance additives, which are optionally used, are typically derived from urea-formaldehyde, ketone formaldehyde or melamine-formaldehyde. Further, it is possible to use other polyhydroxide compounds other than or in addition to starch in the adhesive compositions. For example, polyvinyl alcohol will work with the boron containing compounds in a manner similar to that of raw starch.

Starch based adhesives are typically made in a batch process by first preparing two separate portions, a cooked starch portion referred to as a "carrier" starch, and an uncooked portion referred to as "raw" starch. This is necessary to avoid creating an adhesive too viscous to be handled easily.

Typically, the carrier starch is prepared in a first tank by adding fresh water to starch, which may be either in raw or modified form. The mixture is agitated to form a starch slurry. Caustic is then admixed with the starch slurry and heated to initiate gelation and thereby produce the carrier starch paste portion.

In a second tank, water and starch, typically an unmodified raw starch, are agitated to form a raw starch slurry to which the boron containing compound, typically boric acid or borax is added. After the raw starch portion has been thoroughly mixed, the carrier starch portion is added to it and both are thoroughly mixed together to yield the corrugating adhesive, typically having a solids content of about 17 to 35% by weight and a viscosity in the range of about 150 to 650 centipoises.

The admixed starch adhesive is typically located in a tank of about 150 to 2,000 gallons capacity, with the mixture circulated to a corrugator on demand.

One problem with the prior batch systems is that adhesive preparation must be scheduled to satisfy demand as to timing, amount, specific formulation, viscosity, gel temperature and storage temperature. Generally, large storage tanks are necessary with their number and capacity depending on the variety of formulations and the number of use points within a facility.

After the adhesive has been formulated, any of a number of variables such as the degree of agitation in the tanks, the amount of circulation in the pipes, maintenance of particular temperatures, the continuing action of the basic agent (sodium hydroxide) on the starch in the paste and moisture loss, etc., may cause significant variations in the adhesive viscosity. Further, the costs for batch systems are high due to the need to have a number of storage tanks and specialized equipment for handling the viscous adhesive, while at the same time controlling the various parameters to avoid detrimental viscosity changes.

For example, once the admixture is created, the adhesive begins to age and it is subject to thickening or thinning and viscosity breakdown, which can detrimentally effect the properties of the corrugated product. While various methods have been attempted to control temperature so as to reduce the deterioration in properties with time, it is typical for there to be a significant amount of unused corrugating adhesive, which, once a run is complete, must be disposed of or worked into a new batch of adhesive. Because of the time required to use up a batch of adhesive, the corrugated product quality may vary due to the decrease in the beneficial properties of the corrugating adhesive with time.

SUMMARY OF THE INVENTION

It is an object of the present invention to provide a method for preparing a corrugating adhesive on an as needed basis so as to minimize the amount of holdup within the system to reduce wastage.

It is a further object of the present invention to provide a method for continuously preparing corrugating adhesives so as to maintain the optimum properties of the adhesive during the course of a corrugating run.

It is another object to provide a method for changing the adhesive formulation by drawing from individual stored components virtually immediately to minimize downtime between corrugating runs.

These and other objects of the present invention are achieved by a continuous process for producing a starch based corrugating adhesive. The adhesive is formulated as needed in a rate corresponding substantially to the rate of demand of the corrugator. Viscosity and temperature are continually monitored and controlled just prior to placement on the sheet and there is minimized holdup of any adhesive to eliminate the problems of aging and other degrading factors.

In the invention, a carrier portion of a starch slurry is prepared on a continuous basis by its admixture with a basic agent (sodium hydroxide), to produce a low volume smooth adhesive paste. This is then continually mixed with other adhesive ingredients, which are all stored separately at room temperature in liquid or paste form at concentrations which allow for instantaneous mixing of the various combinations of ingredients, immediately prior to transfer to the corrugator. The only adhesive holdup occurs within a small vessel including mixing and testing chambers, from which the adhesive is delivered to the corrugator, the vessel including means for monitoring the viscosity and for adjusting the quantity of starch slurry mixed with the basic agent so as to obtain the optimum viscosity of the adhesive immediately prior to delivery to the corrugator.

The present invention provides a method for continuously producing corrugating adhesive comprising providing a rate controlled first stream of a basic agent, providing a portion of a rate controlled second stream of raw slurry, admixing the two flowing streams, feeding the admixture to a first chamber, optionally adding a third stream of raw slurry to the first chamber in a rate corresponding to the flow rate of the basic agent, optionally adding water in a corresponding rate to the first mixing chamber and adding a boron containing compound in a similar corresponding rate to the first mixing chamber, mixing the contents of the first chamber together to form an adhesive, providing a second chamber, adjacent to the first chamber, locating viscosity sensor means in the second chamber, providing means for controlling the rates of addition of the rate controlled streams to produce a mixture of properly metered ingredients to the first chamber in a rate corresponding substantially to the rate of use of the adhesive, passing the adhesive through to the second chamber, measuring the viscosity and adjusting the rate of flow of the portion of the second stream of raw starch to control the viscosity for providing a controlled stream of continuously produced corrugating adhesive to a corrugator.

By controlling the flow of each corrugating adhesive ingredient, with the amount of materials proportioned to the flow of the basic agent, very small portions of corrugating adhesive are produced, and very nearly immediately mixed and transferred to a chamber containing a viscosity sensing apparatus. A control signal generated by the apparatus is then used to adjust the flow of the second stream of raw starch in the admixture so as to achieve the proper viscosity of adhesive before it is transported to a corrugator pan. The total feed rate of the ingredients closely approximates the adhesive take up at the corrugator so that very little time passes between the mixing of the ingredients and their placement on the corrugated paper such that properties do not have an opportunity to degrade. Consequently, fresh adhesive is continuously available throughout a corrugator run. Further, changes in processing parameters, such as the need to include a water resistance additive or to adjust the adhesive tackiness or other properties can be made virtually immediately, so as, for example, to simplify change over from one corrugated product to another. Consequently, waste adhesive is substantially eliminated while properties and yields are optimized.

BRIEF DESCRIPTION OF THE DRAWINGS

FIG. 5 is a cross-sectional view of an experimental testing apparatus.

DETAILED DESCRIPTION OF THE INVENTION

Figures 1, 2:
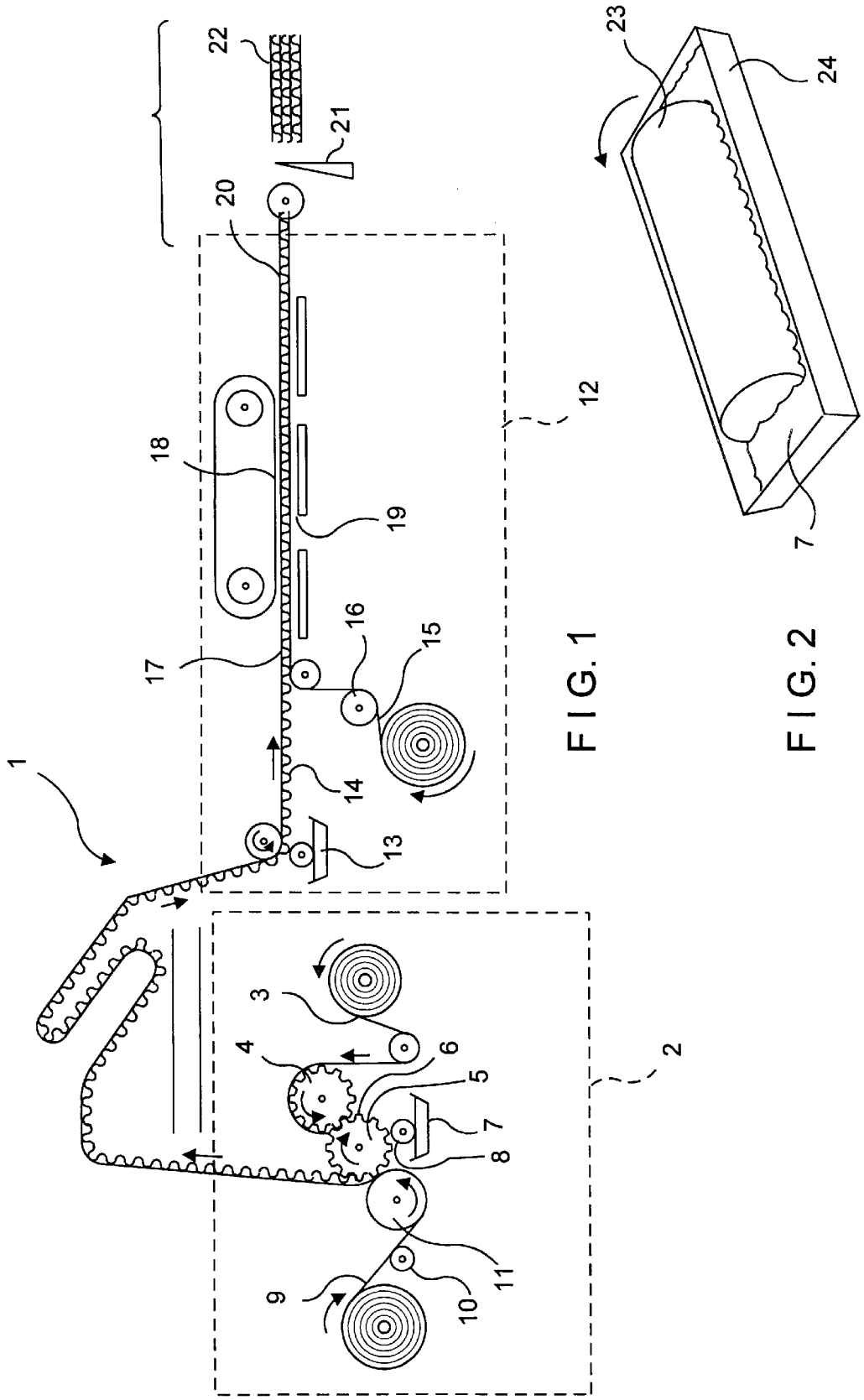
FIG. 1 is a schematic view of a corrugating process.
FIG. 2 is an enlarged view of a corrugating pan.

Referring to FIG. 1, a corrugating production line is illustrated. In this process, an adhesive is applied to the tips of the flutes of a corrugated medium.

A corrugator 1 has a first station 2 where a kraft paper medium 3 is passed between a pair of meshed rolls 4 and 5 which bend the medium to form corrugations 6. An adhesive paste 7 is applied to tips 8 of the corrugations on one side of the sheet which is then joined to a first liner 9, in the presence of heat and pressure. The first liner 9 passes by a preheater 10 and then over a roll 11 for joining the liner to the corrugated medium. The bond at this point must be of sufficient strength and flexibility to withstand the rigorous handling to which the sheet is subjected. This bond is known as the "green bond".

At a second station 12, adhesive 13 is applied to tips 14 of the corrugations on the reverse side of the sheet which is then joined to a second liner 15, which passes over a preheater 16. The assembled board 17 is then passed between two parallel flat horizontal lightly pressing surfaces 18 and 19, one of which is heated with steam to completely gel the adhesive such that when the board emerges from the corrugator, it is a finished flat board 20, which is cut by a knife 21 and stacked as finished blanks 22.

The product resulting from the first station 2, having the corrugating medium on one side and a flat liner on the other side, is termed a "single faced portion". The single faced portion may be used as is or the portion may proceed to the second station 12, where adhesive is applied to the flute tips on the single faced portion and a second flat sheet is applied to produce a "double facer" or "double backer".

As shown in FIG. 2, the adhesive 7 is applied to the tips 8 by contact with a roll 23 which is partially immersed into a pan 24 which contains the adhesive 7 such that only the tips of the flutes are coated with adhesive and then only with the adhesive contained on the roll, which rotates so as to provide fresh adhesive to the flute tips. The pan is kept replenished with adhesive at a sufficiently high flow rate such that the proper level is maintained within the pan. Generally this is done by providing a continuous flow of adhesive to the pan with a gravity overflow or pump used to return excess adhesive to an adhesive supply container (not shown).

Figure 3:
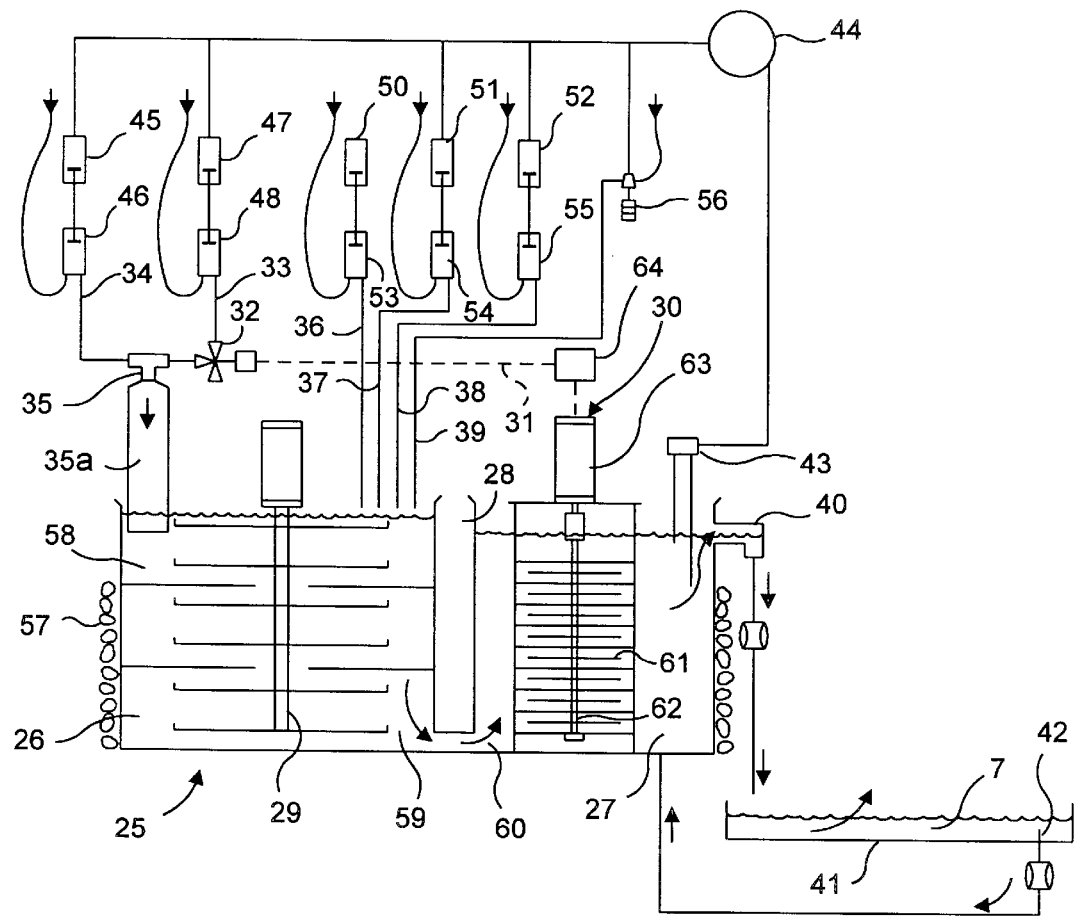
FIG. 3 is an illustration of a system for continuously preparing a corrugating adhesive.

Referring to FIG. 3, a system for producing a corrugating adhesive in accordance with the present invention is shown.

A tank 25 has a mixing chamber 26 and a testing chamber 27, separated by a baffle 28 which provides an underflow from the mixing chamber 26 into the testing chamber 27. The mixing chamber contains a high shear agitator 29 for mixing the various adhesive ingredients together. A viscosity sensor 30 is located within the testing chamber for determining the adhesive viscosity.

To the mixing chamber are added the various ingredients used to produce the corrugating adhesive 7. Each of these is metered as a liquid, slurry or paste in a proportional fashion to the mixing chamber. This may be done by using metering pumps associated with each individual feed stream, by using a microprocessor controller with associated flow control valves or other means known or available to those skilled in the art. The viscosity sensor 30 sends a control signal 31 to a diverter valve 32 to adjustably split the flow rate of a raw slurry stream 33 which is thus controllably either admixed with a basic agent 34 in a mixing tee 35 so as to increase or decrease gelling of the starch, or sent directly into the mixing chamber. In other words, for a particular formula, the diverter valve is fed a predetermined amount of raw starch slurry, with the raw slurry stream fed in whole or in part to either the mixing tee or the mixing chamber, depending on the viscosity of adhesive produced.

A portion 35a of the mixing tee is of sufficient length to allow interaction of the mixed streams before addition to the mixing chamber. No mechanical mixing is required, because the low volumes assure thorough intermixing and no agglomeration occurs, thus a low volume smooth paste is formed. This portion 35a need be nothing more sophisticated than a short length of pipe, to provide some residence time. Generally, the ingredients react near instantaneously, though up to about five seconds of residence time should be provided.

The remaining components, identified as streams 36, additionally raw slurry, 37, water, 38, a boron-containing compound and 39, a waterproofing agent, are all added as needed with a particular recipe, in proportion to the amount of raw slurry which is fed to the diverter valve or the amount of basic agent supplied to the mixing chamber. The total rate of addition of all the components to the mixing chamber corresponds substantially to the rate of uptake of the adhesive onto the corrugating flutes.

The raw starch slurry stream 36 is provided to reduce the amount of raw slurry fed to the diverter valve, so as to provide a good measure of control of the portion fed to the mixing tee, though it is possible to feed all the raw slurry to the diverter valve. Similarly water stream 37 may or may not be needed, depending on the particular recipe chosen, as the water is added in combination with the raw starch slurry. The boron compound is a required ingredient, though the waterproofing stream is clearly optional. Whatever combination of ingredients are chosen, these are all fed proportionally and continuously to the mixing chamber, as described above.

The size of the mixing chamber may range from 1 to 3 times the per minute volume flow of all incoming ingredients, i.e., if the combined ingredient flows add up to about 5 gpm, the size of the mixing chamber may be from about 5 to 15 gallons.

The take up of the adhesive will vary depending on the equipment used, product to be produced, i.e., single facer or double backer, (one vs. two pans), etc. However, the overall rates are in the range of about 0.5 to about 8 gpm, corresponding roughly to corrugator speeds of up to about 1,300 ft./min. Consequently, a mixing chamber size of from about 0.5 to 24 gallons may be used, with about 5 to 15 gallons preferred. It should of course be understood that with the inventive system, being of small modular construction, several units can be distributed about the facility, for example one unit each can serve a single pan as opposed to using a larger unit serving several pans.

The size of the testing chamber is sufficient to accommodate the viscosity sensing device and to provide at least a small reservoir for remixing the recycled adhesive from the corrugator pan to provide a uniform mix. Thus, the testing chamber size may be in the range of from about 0.5 to 24 gallons, though the size is not critical and it may vary depending on the needs of a facility To accommodate a typical viscosity sensor, a testing chamber of about 5 to 15 gallons would be used. Consequently, the total vessel size, with both chambers can range from 1 to about 30 gallons.

Referring again to FIG. 3, the testing chamber 27 has an overflow outlet 40 which delivers adhesive to a corrugator pan 41. The level of adhesive 7 must remain relatively stable, and excess adhesive is removed through an overflow pipe 42 for return to the testing chamber 27. A liquid level sensor 43 is located in the testing chamber which communicates with or includes a controller 44. The controller 44 temporarily halts all the in flowing streams when the level is high, reinitiating the flows when the level drops back below the high point, or to a preselected low level setting.

It is common to use a high recycle rate to keep the adhesive from becoming too hot in the pan. A rate of two or more times the uptake rate is not uncommon, and the invention is adaptable to such a system as the recycled adhesive is readily blended with fresh adhesive in the test chamber. Of course, systems which use no recycle can also be accommodated. Thus, the invention is not limited by such variations.

The particular ingredient feed means will now be described. Referring still to FIG. 3, the apparatus for producing corrugating adhesive has the stream of basic agent 34 fed to the mixing tee 35 at a metered flow rate. In this embodiment of the invention, a pneumatically operated piston 45 communicates with a fill piston 46 which draws a precise volume of basic agent, from a storage tank (not shown) during a fill stroke of the piston. This precise volume of basic agent is then injected into the mixing tee during the downstroke of the piston 46.

A stream of raw slurry 33 is correspondingly metered, using a pneumatically operated piston 47 and a fill piston 48, to the diverter valve, with the strokes coordinated to provide a proportioned mixture in the mixing chamber, though the amount actually fed to the mixing tee will vary, as the diverter valve 32 is used to adjust the flow of raw slurry sent to the mixing tee to adjust the viscosity of the adhesive, as will be discussed further below.

An important advantage of the invention is that the ingredients remain separated prior to entering the mixing chamber, which increases storage life. These ingredients, including the raw starch slurry, may be stored at room temperature and require minimal attention.

For the inventive system, each stream must be in liquid, slurry or paste form. This requires preparation of the raw slurry by mixing starch with water. Also, the boron containing compound must be admixed to form a slurry and then treated to form a paste (i.e. containing thoroughly gelatinized starch) as these compounds are generally insoluble in water. When formulated with a paste, dispersion of the boron is maintained. In a preferred embodiment, the boron containing compound is admixed with a portion of starch paste, sufficient to provide a flowable material with the boron containing compound uniformly distributed in the paste. For example, a 2–5% by weight dry content starch paste can be prepared and the compound added to it, the compound comprising from about 5 to 25% more preferably about 15 to 25% by weight of the paste. The amount of raw starch provided with the compound is compensated for in the adhesive by reducing the amount of raw slurry added in stream 33 or 36.

Raw slurry 36, water 37 and the boron containing compound/slurry 38 are similarly metered into the mixing chamber using pneumatic pistons 50, 51 and 52, respectively, with associated fill pistons 53, 54 and 55 again with the stroke rate and piston displacement volume coordinated and controlled to correspond to the addition rate of the raw starch stream 33 fed to the diverter valve, or to the basic agent stream 34 to provide a desired formulation. Of course, various formulations can be provided, by adjusting the stroke rate or piston displacement of each ingredient. For example, an adhesive having a range of starch content of from about 15–34% wt. can be provided by adjusting the rate of raw slurry addition 36, using pistons 50 and 53.

It should be understood that there are numerous additives which may or may not be required depending on the product produced and these can be supplied on an as needed basis to the mixing chamber, thus minimizing additive costs while optimizing their utilization. Here, a water resistance additive stream 39 is provided on an as needed basis by a metering pump 56 to the mixing chamber.

The admixed ingredients then enter the mixing chamber, where the high shear agitator 29 mixes the adhesive ingredients thoroughly. The mixing and testing chambers are maintained at a particular temperature using a steam jacket 57.

All of the controlled streams follow a defined path through the mixing chamber, passing from an upper portion 58 of the chamber, down around the agitator's propeller blades to a bottom 59 of the chamber where the mixed ingredients then travel under the baffle 28 into the testing chamber 27 illustrated by arrow 60.

The testing chamber contains the viscosity sensor 30, which in this case, is a device which measures the resistance to rotation of disks 61 mounted on a shaft 62 which are turned by a motor 63 at a constant speed.

The amperage consumed by the motor increases or decreases in an amount correlated to the viscosity of the adhesive. The amperage reading is converted by a transducer 64 to generate the control signal 31 which regulates the amount of raw starch which is diverted to and combined with the basic agent by the judicious opening/closing of the diverted valve 36, the undiverted portion entering the mixing chamber. The more starch that is diverted to the mixing tee, the higher the viscosity of the adhesive.

The level sensor 43 allows for an automatic start/stop of the adhesive making process. Since all the streams are metered together, it is relatively simple to halt the flows, as needed, to conserve the ingredients, without fear of a loss in properties, as the unmixed streams have a much longer storage life than the mixed adhesive. With only a 1–30, more preferably about 2–15 and most preferably about 5–8 gallon holdup in the system, wastage is reduced substantially, capital costs are reduced and adhesive properties optimized in accordance with the present invention.

Before describing further the apparatus of the invention, it is necessary to review the ingredients and properties of corrugating adhesives.

Starch is the raw material for the corrugating adhesive, and this is preferably obtained from corn or wheat. The starch is usually obtained as a granular white powder.

Each starch granule is an organized tightly packed rigid agglomeration of polymeric starch molecules held together by intermolecular forces. These bonds can be disrupted with thermal, mechanical or chemical energy. For starch to become an adhesive, these bonds must be disrupted so as loosen the individual molecules from one another as completely as possible.

When starch is heated in the presence of water, the bonds weaken which allow the introduction of water into the spaces between the starch molecules. This gradually increases the volume of the granule. This absorption is manifested as an increase in viscosity. Eventually, however, the continuing application of heat causes the swollen granules to burst releasing their constituent molecules as well as captured water, thereby causing an abrupt decrease in viscosity. This is known as the gel point. For corn starch, this takes place at about 165° F.

If a basic agent such as sodium hydroxide is added to the slurry, the gel point can be reduced to lower temperatures which can be determined and controlled by providing an appropriate ratio of starch to water to sodium hydroxide. Uniform dispersion is of course quite important to obtaining the proper properties for the adhesive. For example, if during the mixing of the ingredients, agitation were inefficient, high concentrations of sodium hydroxide might occur in some spots, which might thereby cause preferential gelling of some granules but not others, with such a preferential gelling causing what is known as "fisheyes". Consequently, vigorous mechanical shearing is necessary to disrupt the bonds and to determine accurately the true level of the viscosity of the adhesive, that is, one that is related mainly to the amount of starch which is dispersed, at the gel temperature. However, it is difficult to assure uniform dispersion because of the high viscosity before gelation occurs.

Viscosity is a prime consideration for a optimized corrugating adhesive, as it is directly related to controlling how, where and how much of the adhesive is placed on the corrugated sheet as it is contacted with the adhesive on the roll.

The adhesive bond is formed by driving off most of the water in the adhesive so as to allow the starch molecules to attach themselves to one another and to the fibers of the sheet. To minimize drying time, it is necessary that the amount of water in the formulation be kept to a minimum. At these minimum levels, if all the necessary starch were to be dispersed in a single batch, the result would be a paste too viscous to handle. Consequently, it has been necessary to prepare the adhesive by dispersing only a portion of the starch in all the water to achieve a slurry of manageable viscosity, this portion being called the carrier and serving as a medium in which the raw undispersed major portion of starch is suspended and carried to the corrugator where it is heated by the paper itself. Because the heat available is limited, the time allowed is very short for the adhesive process to proceed and therefore sodium hydroxide is included in the formulation to lower the gel point of the adhesive to between about 138°–150° F.

If the gel point is too low, there is a possibility of gelling the raw portion of the starch by heat given off in the equipment before the adhesive is applied to the sheet. Also, there is a limit to the amount of water that can be removed from the formulation to speed drying, since it could be driven off before the raw starch has a chance to disperse.

The starch may be either modified or unmodified, a modified starch being treated to enhance its bonding qualities such as to provide a stronger bond or to provide fast setting or to adjust its viscosity stability over time. While of higher cost, the cost is offset by making possible faster corrugator speeds and minimizing the variation in adhesive viscosity. Typically, the modified starches are used in the carrier portion of the paste, the raw portion being made of unmodified starch. However, many plants use unmodified starch for both components of the formulation. The raw stored starch slurry used with the invention typically comprises up to 38% and more preferably about 25 to 38% by weight of starch. A high concentration of starch is preferred because this allows for subsequent dilution to the working concentration of the adhesive in the inventive apparatus.

Water is another ingredient and this may be either fresh water or recycled water, more commonly known as Flexo or machine wash water which had been used to wash equipment in the facilities and therefore it may contain inks or other components which may effect viscosity. Since the apparatus of the invention corrects for viscosity changes, these as well as water of varying pH can be used without any treatment steps.

The next ingredient is a strong basic agent, with sodium hydroxide preferred. Of course other basic agents may be used. Sodium Hydroxide may be obtained as flake, granule or powder or as a 50% solution, and this is preferably diluted to about 2 to 15%, and more preferably, to about 5% wt. dry content. The degree of dilution is related to the volumetric proportion of each ingredient.

A boron containing compound such as sodium borate or boric acid, is typically used to adjust the body, tackiness and other functional properties of the adhesive. Other additives may be included which serve to adjust properties, or to produce particular products, the most common additive being one which increases the water resistance of the corrugated board.

An important consideration in the preparation of a corrugating adhesive is that it has a tendency to age which makes the time between preparation and application critical to obtaining consistent properties. For example, the viscosity of the adhesive is subject to change by reason of mechanical shearing, which occurs through pumping or agitation of the mixture, through temperature changes, biological spoilage, additive reactions and moisture loss.

Figure 4:
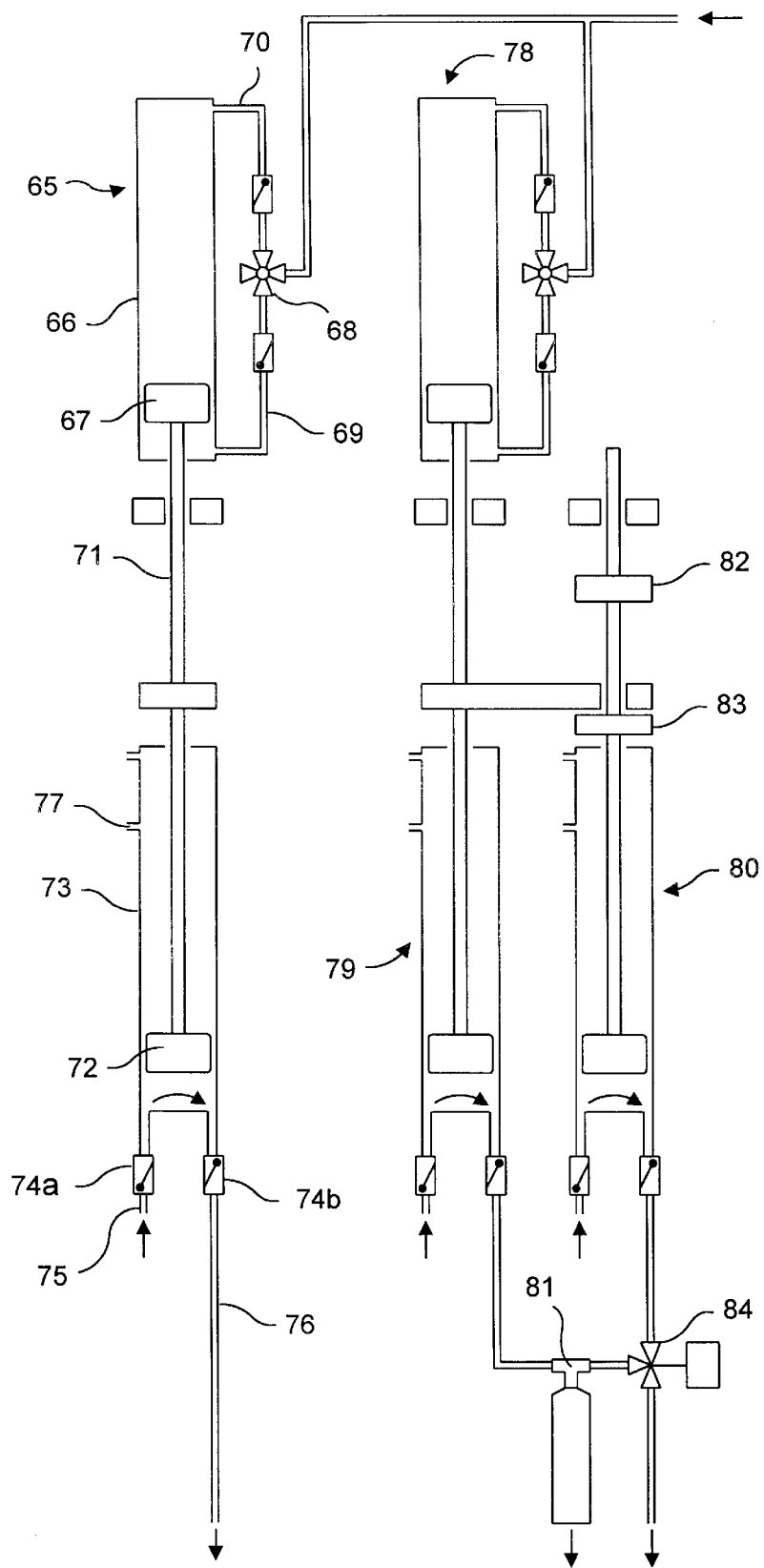
FIG. 4 is an illustrating view of a piston apparatus for feeding the adhesive ingredients.

Referring to FIG. 4, an enlarged view of the piston metering apparatus usable with the present invention is shown. However, it would be understood by those skilled in the art that there are numerous devices and systems available both commercially and technically for providing the coordinated proportioned or metered streams, and the invention is not limited to a piston type arrangement.

A pneumatic piston assembly 65 has a cylinder 66 in which a piston 67 is movable. The piston moves in response to a pressure differential imposed by a valve 68 which supplies air to either side of the piston. When air is supplied through line 69, the piston moves upward and when supplied through line 70, the piston moves downward.

The piston is connected to a shaft 71 which extends to a fill piston 72 located within a cylinder 73. A pair of check valves 74(*a*) and 74(*b*) determine the flow of an ingredient, through an inlet 75 and an outlet 76. The cylinder has a vent 77 to allow displacement of the piston without resistance.

Since the two pistons are joined together, an upward movement of piston 67 pulls piston 72 such that an ingredient is drawn into the cylinder 73. A downstroke then discharges the ingredient through the outlet 76.

As also shown, a single pneumatic piston 78 is connected to two fill pistons 79 and 80 so as to allow precise metering of a raw slurry and a basic agent to the mixing chamber. The ratio of these two ingredients can be varied using an adjustable stop 82 with an adjustable yoke 83. A diverter valve 84 is used to bypass a portion or all of the raw slurry in response to a control signal from the viscosity sensor, the diverted raw slurry entering a mixing tee 81, where the basic agent and raw slurry are mixed together.

EXAMPLE

With reference to FIG. 5, a test was performed to establish that the use of controlled continuous streams could produce a satisfactory corrugating adhesive.

A tank 85 containing a high shear variable speed agitator 86, a temperature sensor 87 and a temperature controller 88 was fed ingredients using graduated syringes. A motor speed indicator 89 and amperage indicator 90 were used with a speed adjuster 91 to control the agitator. The temperature controller 88 controlled heating tape 92 to adjust the tank temperature, indicated on a gauge 93. The tank had a drain valve 94.

The object of the tests was to prove the feasibility of constructing a system for the continuous preparation of starch based corrugating adhesive. In such a system the finished adhesive consumed by the corrugator pan(s) is immediately replenished with freshly made adhesive at a rate of production (gpm) equal to the rate of consumption. Moreover, the system prepares the adhesive with accurate ingredient proportions, controlled temperature, and with high agitational shear to control viscosity.

Procedure (for carrier type adhesive)

To simulate continuous operation, the tests can only start if the tank is already filled with adhesive.

A tank is filed with 1700 cc of previously prepared adhesive with the proper portions of ingredients, adjusted to 108° F. Viscosity is approximately 55 sec Stein Hall cup which is a middle value of the 20 sec to 70 sec range encountered in industry.

100 cc of adhesive is drained out through the drain valve. Then a raw portion of slurry (38% dry content) is syringed into the tank. A carrier paste was formed using 38% dry content raw starch slurry and 5.3% dry content sodium hydroxide solution which are also syringed into the tank. These two may be joined at the mixing tee before entering the tank to maintain or increase viscosity or syringed separately into the tank to decrease viscosity. A water portion is syringed into the tank, if required. Borax is also syringed into the tank, a borax mix having been made up of 10 grams of dry borax admixed with 50 cc of 2–5% dry content raw slurry, formulated as a paste.

After an initial decrease in temperature, all ingredients being at room temperature, heat is applied to the side of the tank automatically to adjust the temperature to 108° F. in 2 min. An initial upset in viscosity is eventually stabilized in 4 min. 100 cc of adhesive is drained, and the process is repeated.

Description of the tests performed (for carrier type paste)

All ingredients were drawn from their respective storage containers, calculated by weight, i.e. dry weight per total weight as a percentage.

All temperature and viscosity readings were taken after the system had reached equilibrium operating conditions. The gelatinization temperature of the samples made was periodically checked and found to be in the 137°–140° F. range.

Test A For final paste @ 33% conc., @ 108° F., unmodified corn starch.

a. Prepare starting batch having 1700 cc, 33% conc., 108° F.

(1301 cc raw starch; 122 cc carrier starch; 258 cc caustic; 19 cc borax)

Viscosity: 0.54 amp (51–53 sec SH)

b. Remove 100 cc through drain valve.

Replenish with 76.5 cc raw directly into tank
        7.2 cc carrier through mixing tee
        15.2 cc caustic through mixing tee
        1.1 cc borax directly into tank
        0.0 water Momentarily motor load to 0.58 amp, temp. To 106° F.

Equilibrium reached in 4 min.

Viscosity: 0.54 amp (51–53 sec SH)

c. Repeat step b three times.

Viscosity: 0.54 amp (51–53 sec SH)

d. Remove 100 cc through drain valve.

Replenish with: 75.0 cc raw directly into tank
        8.7 cc carrier through mixing tee
        15.2 cc caustic through mixing tee
        1.1 cc borax directly into tank Momentarily motor load to 0.61 amp, temp. to 106° F.

Equilibrium reached in 4 min.

Viscosity: 0.57 amp (69–71 sec SH)

e. Repeat step d three times.

Viscosity: 0.60 amp (83–85 sec SH)

f. Remove 100 cc through drain valve.

Replenish with: 76.6 cc raw directly into tank 7.2 cc carrier directly into tank
15.2 cc caustic directly into tank
1.1 cc borax directly into tank
0.0 cc water Momentarily motor load to 0.58 amp, temp. to 106° F.
Equilibrium reached in 3 min.
Viscosity: 0.58 amp (76–78 sec SH)
g. Repeat step f three times.
Viscosity: 0.47 amp (32–34 sec SH)
I. Test discontinued.

Test B For final paste @ 18% conc., @ 108° F., unmodified corn starch.
 a. Prepare starting batch 1700 cc, 18% conc., 108° F.
(594 cc raw; 139 cc carrier; 178 cc caustic; 11 cc borax; 778 cc water)
Viscosity: 0.53 amp (48–50 sec SH)
 b. Remove 100 cc through drain valve.
Replenish with 34.9 cc raw directly into tank
8.2 cc carrier through mixing tee
10.5 cc caustic through mixing tee
0.7 cc borax directly into tank
45.8 cc water directly into tank Momentarily motor load to 0.55 amp, temp. To 106° F.
Equilibrium reached in 4 Min.
Viscosity: 0.53 amp (48–50 sec SH)
 c. Repeat step b three times.
Viscosity: 0.53 amp (48–50 sec SH)
 d. Remove 100 cc through drain valve.
Replenish with: 33.4 cc raw directly into tank
9.7 cc carrier through mixing tee
10.5 cc caustic through mixing tee
0.7 cc borax directly into tank
45.7 cc water directly into tank Momentarily motor load to 0.58 amp, temp. To 106° F.
Equilibrium reached in 4 min.
Viscosity: 054 amp (50–52 sec SH)
 e. Repeat step d three times.
Viscosity: 0.61 amp (88–90 sec SH)
 f. Remove 100 cc through drain valve.
Replenish with: 34.9 cc raw directly into tank
8.2 cc carrier directly into tank
10.5 cc caustic directly into tank
0.7 cc borax directly into tank
45.8 cc water directly into tank Momentarily motor load to 0.64 amp, temp. To 106° F.
Equilibrium reached in 4 Min.
Viscosity: 0.58 amp (78–80 sec SH)
g. Repeat step f three times.
Viscosity: 0.45 amp (28–30 sec SH)
I. Test discontinued.

Test C These two tests were identical to Tests A & B, except & that wheat starch was used for the carrier raw starch
Test D portion of the paste instead of corn starch. A lesser proportion of caustic was employed. A consistent viscosity product was achieved and the results demonstrated the efficacy of the process in controlling paste viscosity in a continuous system.

Test E These two tests were identical to Tests A & B, except & high amylose starch was used for the carrier portion
Test F of the paste instead of corn starch. A lesser proportion of carrier starch was employed. A consistent viscosity product was achieved and the results demonstrated the efficacy of the process in controlling paste viscosity in a continuous stream.

These tests demonstrate the ability of the process to produce final paste at concentrations ranging from 33% starch solids (tests A, C, E) to 18% starch solids (tests B, D, F) whose viscosity can be controlled over the entire range required for corrugating applications.

The tests further demonstrate the ability to produce final adhesive at a desired temperature by means independent of the temperature of the incoming ingredients, which are at or near ambient temperature.

Although not specifically tested, it is evident that the gelatinization temperature can be controlled by variation of the caustic borax portions, as is the practice in the industry, and the throughput rate of the process can be controlled by the proper adjustment of the flow rate of each ingredient while maintaining their proportions.

Figure 6:
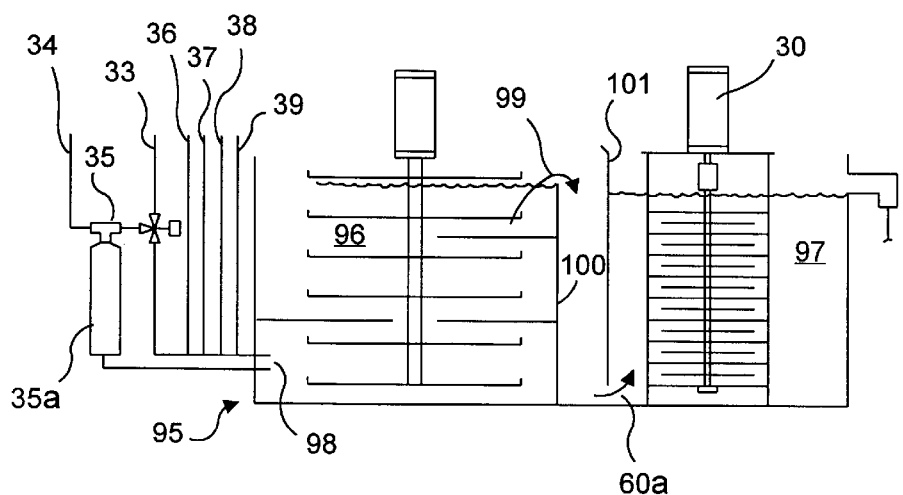
FIG. 6 is an alternative mixing vessel usable with the present invention.

Referring to FIG. 6, an alternative vessel 95 usable with the present invention is shown. The vessel 95 has a mixing chamber 96 and a testing chamber 97. However, an alternate feed and baffle system is used, to alter the flow path through these chambers.

Each of the feed streams 33, 34, 36, 37, 38 and 39 enter the mixing chamber at a bottom end 98. As previously discussed, the admixture is prepared in the mixing tee 35. Instead of an underflow, here, a baffle 100 directs the ingredients to overflow from the mixing chamber, as indicated by an arrow 99. A second baffle 101 then requires the mixed ingredients to enter the testing chamber, again with an underflow, as indicated by arrow 60a.

This arrangement provides a constant level in the mixing chamber, to promote uniform mixing of the ingredients, and to keep the high shear agitator fully covered. Of course, there are a number of other baffle arrangements available.

While preferred embodiments have been shown and described, it will be understood by those skilled in the art that other modifications can be made without varying from the scope of the invention.

I claim:

1. A method for producing a corrugating adhesive in low volume at a continuous rate substantially corresponding to a rate of adhesive use in a corrugating apparatus, comprising:
   providing a first rate controlled stream of basic agent;
   providing a second rate controlled stream of a raw starch slurry;
   admixing the first and a variable portion of the second rate controlled streams to form a third rate controlled stream and feeding the third rate controlled stream to a first chamber, a balance of the second rate controlled stream added to the first chamber;
   simultaneously adding a boron containing compound stream to the first chamber, and simultaneously optionally adding an additional raw starch slurry stream and a water stream to the first chamber, each added to the first chamber in a rate proportional to the flow rate of either the first rate controlled stream or the second rate controlled stream;
   mixing the streams together in the first chamber as they pass therethrough to form an adhesive;
   providing a second chamber, adjacent to the first chamber;
   locating a viscosity sensor in the second chamber;
   passing the adhesive at a rate corresponding to a combined rate of addition of the streams added to the first chamber to the second chamber;
   measuring a viscosity of the adhesive using the viscosity sensor and generating a control signal therefrom;
   adjusting the rate of the variable portion of the second rate controlled stream in response to the control signal to adjust the adhesive viscosity; and, supplying the adhesive to the corrugating apparatus.

2. The method of claim 1 further comprising heating the first and second chambers.

3. The method of claim 1, further comprising adding a property adjusting additive to the first chamber in a rate proportional to the flow rate of either the first or second rate controlled stream.

4. The method of claim 1 further comprising sensing a level in the first or second chamber, halting the addition of each stream when a high level is sensed and reinitiating the addition of each stream when a low level is sensed.

5. The method of claim 1 further comprising returning a portion of the delivered adhesive to the second chamber and blending the returned portion with the adhesive in the second chamber.

6. The method of claim 1 wherein a total rate of addition of each stream corresponds substantially to a rate of usage of adhesive by the corrugating apparatus.

7. The method of claim 6 wherein the combined rate of addition is in the range of about 0.5 to about 8 gpm.

8. The method of claim 1 further comprising preparing the boron containing compound stream by adding a boron containing compound to a starch slurry formulated as a paste.

* * * * *